US010814878B2

(12) United States Patent
Inoue et al.

(10) Patent No.: US 10,814,878 B2
(45) Date of Patent: Oct. 27, 2020

(54) CONTROL DEVICE OF AUTOMATIC TRANSMISSION

(71) Applicant: TOYOTA JIDOSHA KABUSHIKI KAISHA, Toyota-shi, Aichi-ken (JP)

(72) Inventors: Junichi Inoue, Toyota (JP); Tsuyoshi Fujikane, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 14 days.

(21) Appl. No.: 16/217,168

(22) Filed: Dec. 12, 2018

(65) Prior Publication Data

US 2019/0225225 A1 Jul. 25, 2019

(30) Foreign Application Priority Data

Jan. 24, 2018 (JP) ................... 2018-009316

(51) Int. Cl.
*B60W 30/19* (2012.01)
*B60W 10/02* (2006.01)
*B60W 10/11* (2012.01)

(52) U.S. Cl.
CPC .......... *B60W 30/19* (2013.01); *B60W 10/026* (2013.01); *B60W 10/11* (2013.01); *B60W 2520/10* (2013.01); *B60W 2530/16* (2013.01); *B60W 2540/10* (2013.01); *B60W 2710/024* (2013.01); *B60W 2710/1005* (2013.01)

(58) Field of Classification Search
CPC .... B60W 30/19; B60W 10/026; B60W 10/11; B60W 2520/10; B60W 2530/16; B60W 2540/10; B60W 2710/24; B60W 2710/1005
See application file for complete search history.

(56) References Cited

U.S. PATENT DOCUMENTS

| 8,641,578 B2* | 2/2014 | Kitajima | F16H 61/143 477/180 |
| 2003/0203790 A1 | 10/2003 | Matsubara et al. | |
| 2010/0248875 A1* | 9/2010 | Jozaki | F16H 61/66259 474/29 |
| 2011/0239804 A1* | 10/2011 | Hase | B60K 6/48 74/473.11 |
| 2014/0018207 A1* | 1/2014 | Kobayashi | B60K 6/48 477/5 |
| 2017/0158198 A1 | 6/2017 | Takahashi | |
| 2017/0274905 A1 | 9/2017 | Sugawara et al. | |

FOREIGN PATENT DOCUMENTS

| CN | 1453160 A | 11/2003 |
| CN | 106838298 A | 6/2017 |
| JP | H06-235456 A | 8/1994 |
| JP | 2005-201225 A | 7/2005 |
| JP | 2013-119875 A | 6/2013 |
| JP | 2017-172630 A | 9/2017 |

* cited by examiner

*Primary Examiner* — Huan Le
(74) *Attorney, Agent, or Firm* — Oliff PLC

(57) ABSTRACT

A control device of an automatic transmission to set and control a gear position based on a vehicle speed and an accelerator opening degree, includes a controller determining a high load travel based on a travel resistance during travel control on a gear shift line, which is set such that a region on a higher accelerator opening degree side of a downshift line is a region where a lock-up clutch is to be turned off, and turning off the lock-up clutch before downshifting when determining the high load travel.

4 Claims, 3 Drawing Sheets

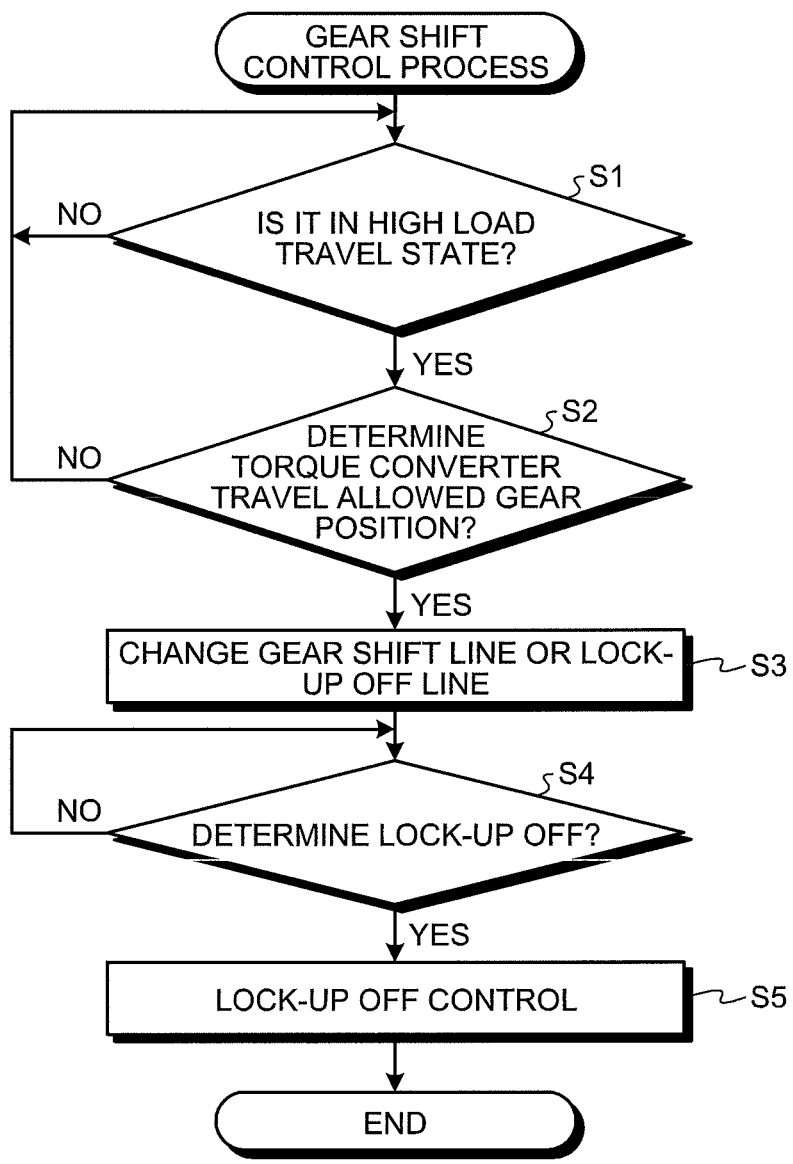

CONTROL DEVICE OF AUTOMATIC TRANSMISSION

CROSS-REFERENCE TO RELATED APPLICATION(S)

The present application claims priority to and incorporates by reference the entire contents of Japanese Patent Application No. 2018-009316 filed in Japan on Jan. 24, 2018.

BACKGROUND

The present disclosure relates to a control device of an automatic transmission.

Japanese Laid-open Patent Publication No. 2005-201225 discloses a technology which, in a vehicle including a torque converter with a lock-up clutch, appropriately satisfies both gear shift responsiveness and gear shift shock upon downshifting. Specifically, in the technology disclosed in Japanese Laid-open Patent Publication No. 2005-201225, when an accelerator operation amount is equal to or greater than a determination value upon downshifting, the downshifting is executed while the lock-up clutch is kept engaged.

In the technology disclosed in Japanese Laid-open Patent Publication No. 2005-201225, in order to improve the gear shift responsiveness upon downshifting, an operating region where the lock-up clutch is turned on is enlarged, and gear shifting is executed while the lock-up clutch is turned on. Therefore, in the technology disclosed in Japanese Laid-open Patent Publication No. 2005-201225, since the state where the lock-up clutch is turned on is maintained even in a high load region, the gear shifting to a low gear position side is performed in the high load region. However, if a travel continues with a travel resistance corresponding to a load in the vicinity of a gear shift point, gear shifting frequently occurs to adjust the driving force.

SUMMARY

There is a need for providing a control device of an automatic transmission capable of preventing a frequent occurrence of gear shifting for adjusting driving force.

A control device of on automatic transmission to set and control a gear position based on a vehicle speed and an accelerator opening degree, includes: a controller determining a high load travel based on a travel resistance during travel control on a gear shift line, which is set such that a region on a higher accelerator opening degree side of a downshift line is a region where a lock-up clutch is to be turned off, and turning off the lock-up clutch before downshifting when determining the high load travel.

BRIEF DESCRIPTION OF THE DRAWINGS

FIG. 2 is a flowchart illustrating a flow of a gear shift control process according to an embodiment of the present disclosure.

DETAILED DESCRIPTION

A configuration and an operation of a control device of an automatic transmission according to an embodiment of the present disclosure are described below with reference to the accompanying drawings.

Configuration

First, an example configuration of a vehicle having the control device of the automatic transmission according to the embodiment of the present disclosure is described with reference to FIG. 1.

Figure 1:
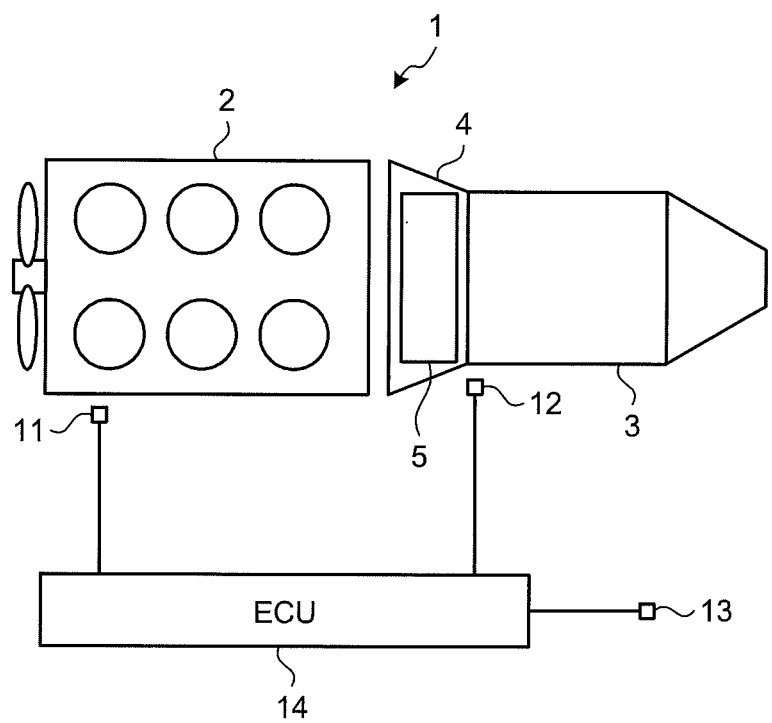
FIG. 1 is a schematic diagram illustrating an example configuration of a vehicle having a control device of an automatic transmission according to an embodiment of the present disclosure.

FIG. 1 is a schematic diagram illustrating a configuration of the vehicle having the control device for the automatic transmission according to an embodiment of the present disclosure. As illustrated in FIG. 1, a vehicle 1 having the control device for the automatic transmission according to the embodiment of the present disclosure includes an engine 2, an automatic transmission 3, a torque converter 4, and a lock-up clutch 5 as main components.

The engine 2 is, for example, an internal-combustion engine such as a gasoline engine and a diesel engine which generates a driving force by combustion of fuel injected into a cylinder, for example.

The automatic transmission 3 changes a speed of the sum of output torque of the torque converter 4 and output torque of the lock-up clutch 5, and thereafter transmits the same to drive wheels (not illustrated).

The torque converter 4 includes a pump impeller, which corresponds to an input rotational member coupled to a clank shaft of the engine 2, and a turbine runner, which corresponds to an output rotational member coupled to the transmission through a turbine shaft, and serve as a fluid power transmitting device which transmits power through fluid.

The lock-up clutch 5 in a fully engaged state mechanically directly connects an input side and an output side of the torque converter 4 to each other to disable a fluid power transmitting function by the pump impeller and the turbine runner of the torque converter 4. The lock-up clutch 5 is configured such that an engaging state thereof is controlled among a disengaged state (lock-up off state), a slip engaged state (half engaged state), and a fully engaged state (lock-up on state) under the control of an Electronic Control Unit (ECU) 14 which is described below.

As illustrated in FIG. 1, as a control system, the vehicle 1 includes an engine rotational speed sensor 11, a turbine rotational speed sensor 12, an accelerator opening degree sensor 13, and the ECU 14.

The engine rotational speed sensor 11 detects a rotational speed of the engine 2 and outputs an electric signal indicating the detected rotational speed of the engine 2 to the ECU 14.

The turbine rotational speed sensor 12 detects a turbine rotational speed which is a rotational speed of an input shaft of the automatic transmission 3 (output shaft of the torque converter 4), and outputs an electric signal indicating the detected turbine rotational speed to the ECU 14.

The accelerator opening degree sensor 13 detects an opening degree of an accelerator pedal of the vehicle 1 as an accelerator opening degree and outputs an electric signal indicating the detected accelerator opening degree to the ECU 14.

The ECU 14 is formed of an information processing device such as a microcomputer, and an arithmetic processing unit such as a central processing unit (CPU) included therein executes a control program to control an operation of an entire vehicle 1. In this embodiment, the ECU 14 sets a gear position of the automatic transmission 3 based on the vehicle speed and the accelerator opening degree to perform the control.

In the vehicle 1 having such a configuration, the ECU 14 executes a gear shift control process which is described below, so that a frequent occurrence of gear shifting to adjust the driving force is inhibited even when there is a travel resistance corresponding to a load near a gear shift point. Hereinafter, with reference to FIGS. 2, 3A, and 3B, an example operation of the ECU 14 is described when executing the gear shift control process according to an embodiment of the present disclosure.

Gear Shift Control Process

Figure 3A:
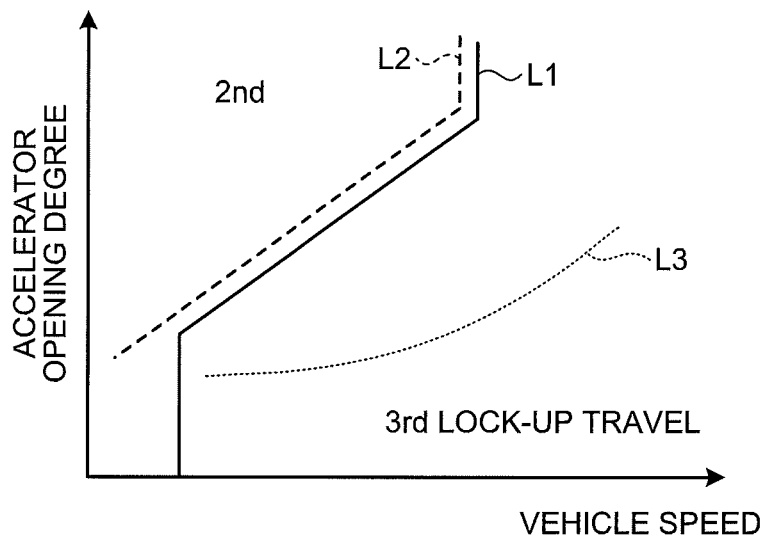
FIG. 3A is a view illustrating a downshift line, a lock-up off line, and a travel resistance line during normal load travel.
Figure 3B:
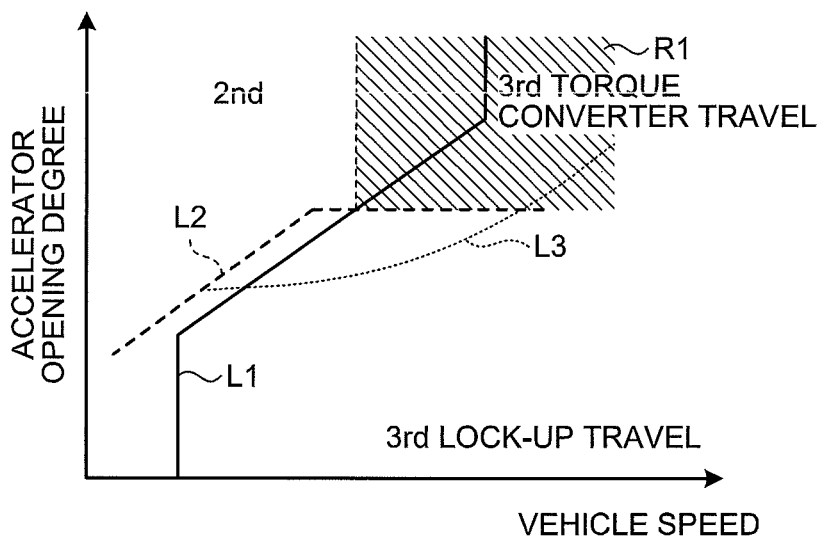
FIG. 3B is a view illustrating a downshift line, a lock-up off line, and a travel resistance line during high load travel.

FIG. 2 is a flowchart illustrating a flow of the gear shift control process being one embodiment of the present disclosure. FIGS. 3A and 3B are views illustrating a downshift line L1, a lock-up off line L2, and a travel resistance line L3 during normal load travel and high load travel. In the maps illustrated in FIGS. 3A and 3B, a higher accelerator opening degree side than the downshift line L1 is set as a region in which the lock-up clutch 5 is turned off. The flowchart illustrated in FIG. 2 starts at timing at which an ignition switch of the vehicle 1 is switched from an off state to an on state and the gear shift control process shifts to a process at step S1.

In step S1, the ECU 14 predicts a current output torque and generated driving force of the engine 2 from a measured air amount, and estimates the current travel resistance of the vehicle 1 from a relationship with a measured acceleration obtained from a vehicle speed and an engine rotational speed change rate ("generated driving force"–"travel resistance"="vehicle weight"×"acceleration"). Then, the ECU 14 determines whether the vehicle 1 is in a high load travel state by determining whether the estimated travel resistance is equal to or greater than a threshold. As a result of the determination, when the travel resistance is equal to or greater than the threshold (step S1: Yes), the ECU 14 determines that the vehicle 1 is in the high load travel state and the gear shift control process goes to step S2. On the other hand, when the travel resistance is less than the threshold (step S1: No), the ECU 14 determines that the vehicle 1 is not in the high load travel state and the gear shift control process goes back to step S1.

Although it is determined whether the vehicle 1 is in the high load travel state based on the travel resistance in this embodiment, it is also possible to determine whether the vehicle 1 is in the high load travel state based on an operation of an accelerator pedal by a driver or a gear shift tendency (busy shift). It is also possible to determine whether the vehicle 1 is in the high load travel state by detecting a road surface gradient obtained from a vehicle external information such as map data or an image of the road. Alternatively, it is possible to determine that the vehicle 1 is in the high load travel state when a difference (margin) from the driving force corresponding to a downshift point is equal to or greater than a threshold, when the busy shift occurs with an accelerator high opening degree, or when the road surface gradient is equal to or greater than the threshold.

In step S2, the ECU 14 determines whether the vehicle 1 is in a torque converter travel allowed gear position, which herein refers to a gear position where a difference in driving force, which is between before and after downshifting, is equal to or greater than a predetermined value, can be generated. It is possible to determine whether the vehicle 1 is in the gear position where the difference in the driving force, which is between before and after downshifting equal to or greater than the predetermined value, can be generated by referring to, for example, a table data set in advance. As a result of the determination, when it is determined that the vehicle 1 is in the torque converter travel allowed gear position (step S2: Yes), the gear shift control process goes to step S3 by the ECU 14. Otherwise, that is, when it is determined that the vehicle 1 is not in the torque converter travel allowed gear position (step S2: No), the gear shift control process goes back to step S1 by the ECU 14.

In step 33, the ECU 14 allows the torque converter travel in the gear position before the gear shifting, and replace the downshift line L1 or the lock-up off line L2 for the normal load travel state (on a flat road and the like) illustrated in FIG. 3A with the down shift line L1 or the lock-up off line L2, respectively, for the high load travel state (on an uphill road and the like) illustrated in FIG. 3B so as to shift to the torque converter travel at a timing earlier than a driver request (accelerator opening degree and the like) for executing the downshift determination. As a result, the process of step S3 is completed and this gear shift control process goes to step S4.

In step S4, the ECU 14 determines whether a lock-up off condition is satisfied based on the downshift line L1 and the lock-up off line L2 during the high load travel illustrated in FIG. 3B. As a result of the determination, when the lock-up off condition is satisfied (step S4: Yes), the gear shift control process goes to step S5 by the ECU 14. On the other hand, when the lock-up off condition is not satisfied (step S4: No), the gear shift control process goes back to step S4 by the ECU 14.

In step S5, the ECU 14 controls a state of the lock-up clutch 5 to an off state. According to such process, for example, before performing the downshifting from third (3rd) to second (2nd) during uphill travel, it shifts to the lock-up travel in third and the torque converter travel in third (lock-up off travel in a region R1 illustrated in FIG. 3B), so that appropriate driving force can be realized. Then, the process of step S5 is completed and a series of vehicle gear shift control processes is finished.

As is apparent from the description above, in the gear shift control process according to an embodiment of the present disclosure, the ECU 14 determines the high load travel based on the travel resistance during the travel control on a gear shift line set such that a region on the higher accelerator opening degree side of the downshift line is a region in which the lock-up clutch 5 is to be turned off, and turns off the lock-up clutch 5 before the downshifting when the high load travel is determined, so that it is possible to prevent a frequent occurrence of gear shifting for adjusting the driving force.

In the gear shift control process according to an embodiment of the present disclosure, the ECU 14 turns off the lock-up clutch before downshifting when determining that it is the high load travel and that the vehicle 1 is in the gear position where the difference in the driving force to be generated, which is between before and after downshifting, is equal to or greater than a predetermined value. Therefore, it is possible to prevent a gear shift shock at the time of the downshifting.

According to the control device of the automatic transmission according to the present disclosure, when it is determined that the vehicle is in the high load travel based on the travel resistance, the lock-up clutch is turned off before downshifting, so that a frequent occurrence of the gear shifting for adjusting the driving force can be prevented.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device for use with an automatic transmission in a vehicle, which sets and controls a gear position based on a vehicle speed and an accelerator opening degree, the control device comprising:
a controller configured to:
determine whether the vehicle is in a high load travel state based on a travel resistance during travel control on a gear shift line, which is set to a region on a higher accelerator opening degree side of a downshift line where a lock-up clutch is turned off, and
turn off the lock-up clutch before downshifting when the vehicle is determined as being in the high load travel state.

2. The control device of the automatic transmission according to claim 1, wherein
the controller is further configured to:
turn off the lock-up clutch before the downshifting when: (a) the vehicle is determined as being in the high load travel state, and (b) determining that the vehicle is travelling in the gear position where a difference in a driving force to be generated, which is between before and after the downshifting, is equal to or greater than a predetermined value.

3. A control device for use with an automatic transmission in a vehicle, which sets and controls a gear position based on a vehicle speed and an accelerator opening degree, the control device comprising:
a processor configured to:
determine whether the vehicle is in a high load travel state based on a travel resistance during travel control on a gear shift line, which is set to a region on a higher accelerator opening degree side of a downshift line where a lock-up clutch is turned off, and
turn off the lock-up clutch before downshifting when the vehicle is determined as being in the high load travel state.

4. The control device according to claim 3, wherein the processor is further configured to:
turn off the lock-up clutch before the downshifting when: (a) the vehicle is determined as being in the high load travel state, and (b) determining that the vehicle is travelling in the gear position where a difference in a driving force to be generated, which is between before and after the downshifting, is equal to or greater than a predetermined value.

* * * * *